US010817186B2

(12) United States Patent
Yamada (10) Patent No.: US 10,817,186 B2
(45) Date of Patent: Oct. 27, 2020

(54) MEMORY SYSTEM

(71) Applicant: TOSHIBA MEMORY CORPORATION, Minato-ku (JP)

(72) Inventor: Tomiyuki Yamada, Fujisawa (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 70 days.

(21) Appl. No.: 15/908,853

(22) Filed: Mar. 1, 2018

(65) Prior Publication Data

US 2019/0073140 A1 Mar. 7, 2019

(30) Foreign Application Priority Data

Sep. 4, 2017 (JP) ................................. 2017-169477

(51) Int. Cl.
*G06F 3/06* (2006.01)

(52) U.S. Cl.
CPC ............ *G06F 3/0616* (2013.01); *G06F 3/064* (2013.01); *G06F 3/0613* (2013.01); *G06F 3/0656* (2013.01); *G06F 3/0679* (2013.01)

(58) Field of Classification Search
CPC .... G06F 3/0616; G06F 3/0679; G06F 3/0656; G06F 3/0613; G06F 3/064
See application file for complete search history.

(56) References Cited

U.S. PATENT DOCUMENTS

| 2010/0162055 | A1* | 6/2010 | Morita .................. G06F 11/073 714/704 |
| 2015/0058534 | A1 | 2/2015 | Lin |
| 2015/0186257 | A1 | 7/2015 | Ramalingam et al. |
| 2016/0266793 | A1* | 9/2016 | Saito ..................... G06F 3/0611 |
| 2016/0313921 | A1 | 10/2016 | Kojima |
| 2018/0349035 | A1* | 12/2018 | Ellis ........................ G06F 3/061 |

* cited by examiner

*Primary Examiner* — David Yi
*Assistant Examiner* — Zubair Ahmed
(74) *Attorney, Agent, or Firm* — Oblon, McClelland, Maier & Neustadt, L.L.P.

(57) ABSTRACT

According to one embodiment, a memory includes a non-volatile memory, a first buffer, a first circuit, a second circuit, and a third circuit. The first circuit transfers data from a host to the non-volatile memory through the first buffer. The second circuit executes garbage collection through the first buffer. The first buffer includes a second buffer and a third buffer. The second buffer can be allocated to the first and second circuit. The third buffer can be allocated only to the first circuit. The third circuit includes a timer. The third circuit allocates the first buffer to the first circuit or the second circuit upon writing of data in the non-volatile memory from the second buffer. The third circuit, after data is written into the non-volatile memory from the third buffer, allocates the third buffer to the first circuit at timing based on the timer.

12 Claims, 10 Drawing Sheets

MEMORY SYSTEM

CROSS-REFERENCE TO RELATED APPLICATIONS

This application is based upon and claims the benefit of priority from Japanese Patent Application No. 2017-169477, filed on Sep. 4, 2017; the entire contents of which are incorporated herein by reference.

FIELD

Embodiments described herein relate generally to a memory system.

BACKGROUND

Conventionally, a memory system implementing a NAND type flash memory (hereinafter, referred to as "NAND memory") is known.

Generally, data stored in the NAND memory cannot be overwritten. In addition, on the NAND memory, data cannot be erased in a unit smaller than a block. Accordingly, a memory controller provided in a memory system relocates data in the NAND memory so as to generate a block having an empty area. The processing of data relocation is called a garbage collection.

When the garbage collection is initiated, resources of the memory system are spent in the data relocation, and thus latency for write accesses from a host may deteriorate.

DETAILED DESCRIPTION

In general, according to one embodiment, a memory system is connectable to a host. The memory system includes a non-volatile memory, a first buffer, a first circuit, a second circuit, and a third circuit. The first circuit is configured to write data received from the host into the non-volatile memory through the first buffer. The second circuit is configured to read out data from the non-volatile memory, and write the read data into the non-volatile memory through the first buffer. The first buffer includes a second buffer and a third buffer. The second buffer is capable of being allocated to the first circuit and the second circuit. The third buffer is capable of being allocated to the first circuit and is not allocated to the second circuit. The third circuit includes a timer. The third circuit is configured to allocate the first buffer to the first circuit or to the second circuit upon writing data into the non-volatile memory from the second buffer. The third circuit is configured to, after data is written in the non-volatile memory from the third buffer, allocate the third buffer to the first circuit at timing corresponding to setting time set to the timer.

Embodiments of the memory system will be explained below in detail with reference to the accompanying drawings. The invention is not limited to the following embodiments.

First Embodiment

Figure 1:
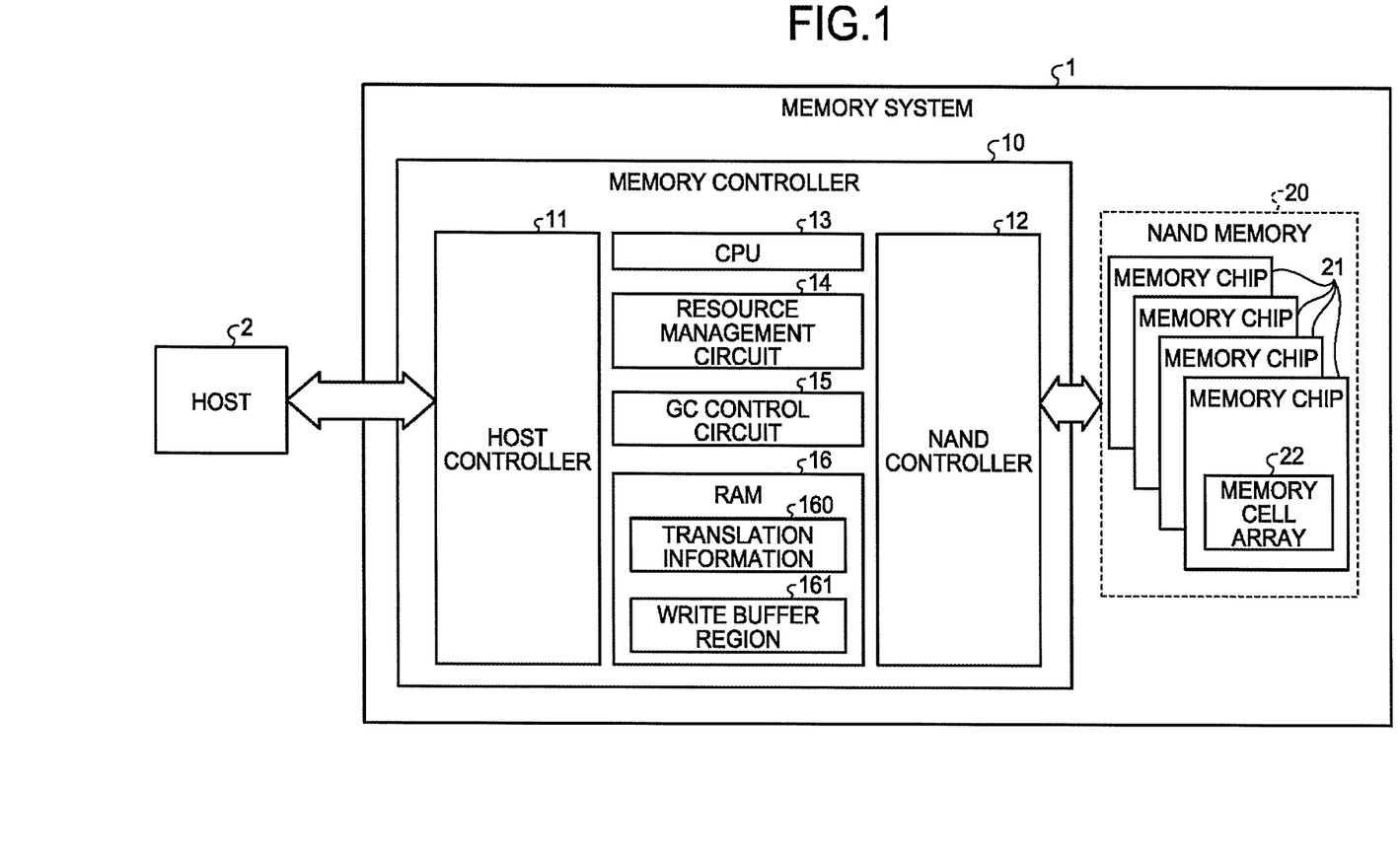
FIG. 1 is a view illustrating a configuration example of a memory system according to a first embodiment.

FIG. 1 is a view illustrating a configuration example of a memory system according to the first embodiment. A memory system 1 is connectable to a host 2. The standard of a communication path between the memory system 1 and the host 2 is not limited to a specific standard. In an example, serial attached SCSI (SAS) can be adopted.

The host 2 corresponds to, for example, a personal computer, a personal digital assistant, a server, and the like. The memory system 1 can receive access commands (a read command and a write command) from the host 2. Each of the access commands includes a logical address indicating an access destination. The logical address indicates a location in a logical address space that is provided to the host 2 by the memory system 1. The memory system 1 can receive a write command and data that is requested to be written by the write command.

The memory system 1 includes a memory controller 10, and a NAND-type flash memory (NAND memory) 20. The memory controller 10 controls data transfer between the host 2 and the NAND memory 20.

The NAND memory 20 is an example of a non-volatile memory. The memory system 1 can include any kind of non-volatile memory instead of the NAND memory 20 such as a NOR type flash memory, for example.

Figure 2:
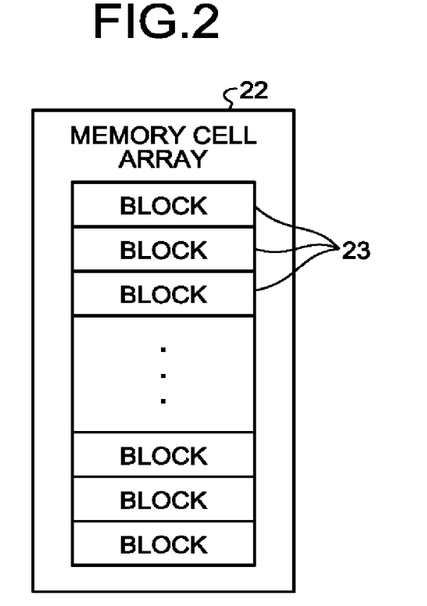
FIG. 2 is a view illustrating blocks which are included in the memory cell array according to the first embodiment.

The NAND memory 20 may be constituted by one or more memory chips 21. Each of the memory chips 21 includes a memory cell array 22. As illustrated in FIG. 2, the memory cell array 22 includes a plurality of blocks 23. All data stored in one of the blocks 23 is collectively erased. Each of the blocks 23 includes a plurality of pages. Each of the pages is a minimum area from which data can be read or in which the data can be written.

Here, a method of writing data in the NAND memory 20 will be explained. Data (new data) transmitted from the host 2 is written in a block 23 having an empty area. When the new data is written in the block 23, translation information (translation information 160 shown in FIG. 1), which indicates a correlation between logical addresses and physical addresses, is updated. A physical address indicates a physical location in the NAND memory 20. Through the updating of the translation information 160, the logical address indicating a location of the new data in the logical address space is correlated with a physical address indicating a location of a write destination of the new data in the NAND memory 20.

In a case where a physical address indicating a location of another data (old data) has been correlated with the logical address before the new data is written, through updating of the translation information 160, the physical address indicating a write destination of the old data becomes a state in which its physical address is not correlated with any logical address. As a result, the memory system 1 becomes a state in which the host 2 can read new data but cannot read the old data. Data, which is stored in a location indicated by a physical address correlated with a logical address, is described as valid data. Data, which is stored in a location indicated by a physical address that is not correlated with any logical address, is described as invalid data.

Writing data into the NAND memory 20 consumes empty areas. The memory controller 10 erases invalid data to generate a block 23 having empty areas. However, it is rare that all data stored in one block 23 is invalid, and thus the memory controller 10 copies valid data left in a certain block 23 to another block 23. The memory controller 10 copies the valid data and updates the translation information 160, and thus valid data in the block 23 that is a copy source is relocated to another block 23 that is a copy destination. Through the relocation of the valid data, the block 23 that is the copy source becomes a state in which valid data is not stored. A block 23 that has become to store no valid data through the relocation is referred to as a free block. A plurality of pieces of data, which are stored in a free block, are collectively erased, and the entirety of pages in the free block becomes empty areas. Relocating valid data among blocks 23 so as to increase the number of free blocks is referred to as a garbage collection.

It should be noted that a block 23 of a copy source and a block 23 of a copy destination can be selected by any method. In an example, among the plurality of blocks 23, a block 23 in which small amount of valid data is stored may be preferentially selected as a copy source. A block 23 having an empty area may be selected as a copy destination.

As described above, the memory controller 10 performs two kinds of writing on the NAND memory 20, that is, writing of data received from the host 2, and writing of data read out from the NAND memory 20 as part of the garbage collection. Hereinafter, writing of the data which is received from the host 2, into the NAND memory 20 may be referred to as host write. In addition, writing into the NAND memory 20, which is caused by the garbage collection, may be referred to as garbage collection write (GC write).

Returning to FIG. 1, the memory controller 10 includes a host controller 11, a NAND controller 12, a central processing unit (CPU) 13, a resource management circuit 14, a garbage collection (GC) control circuit 15, an a random access memory (RAM) 16. For example, the memory controller 10 may be constituted as a system on a chip (SoC). The memory controller 10 may be constituted with a plurality of chips.

The RAM 16 functions as a storage area that can temporarily store data. The RAM 16 is not limited to a specific kind of memory. For example, the RAM 16 can be constituted by a dynamic random access memory (DRAM), a static random access memory (SRAM), or a combination thereof. The RAM 16 can be constituted by a volatile memory.

The translation information 160 is stored in the RAM 16. The translation information 160 is updated on the RAM 16. The translation information 160 is written (stored) into the NAND memory 20 from the RAM 16 at predetermined timing. The translation information 160, which is stored in the NAND memory 20, is loaded on the RAM 16 from the NAND memory 20 at start-up of the memory system 1. It should be noted that, the translation information 160 may be stored in the NAND memory 20, and a part of the translation information 160 may be cached to the RAM 16 as necessary.

Figure 3:
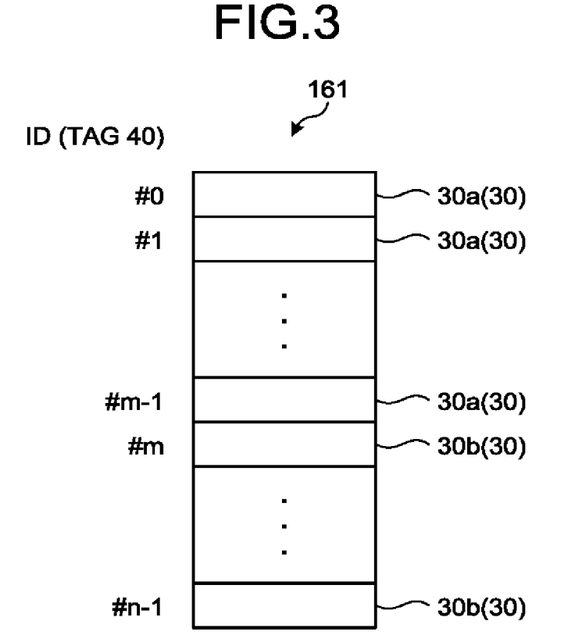
FIG. 3 is a view illustrating an example of a memory structure in a write buffer area according to the first embodiment.

The RAM 16 includes a write buffer area 161. Data that is to be written into the NAND memory 20 by the host write, and data that is to be written in the NAND memory 20 by the garbage collection are temporarily stored in the write buffer area 161. FIG. 3 is a view illustrating an example of a memory structure of the write buffer area 161.

As illustrated in FIG. 3, the write buffer area 161 includes a plurality of unit areas 30. A size of each of the unit areas 30 may be the same as a size of the page, or may be different from the size of the page. For example, the size of the unit area 30 is the same as a size of unit data called a cluster that is smaller than the page. The unit area 30 is identified by an ID. The ID of the unit area 30 is referred to as a tag (tag 40).

Furthermore, the plurality of unit areas 30 include one or more unit areas 30a and one or more unit areas 30b. In the example illustrated in FIG. 3, unit areas 30, of which values of tags 40 are in a range from #0 to # m−1, correspond to the unit areas 30a, and unit areas 30 of which values of tags 40 are in a range from # m to # n−1, correspond to the unit areas 30b. Here, values of tags 40 are assigned in an ascending order from the head of the write buffer area 161. "n" represents the number of the unit areas 30 included in the write buffer area 161. The unit areas 30a and the unit areas 30b will be explained later.

The resource management circuit 14 allocates each of the unit areas 30 for the host write or for the GC write. The unit area 30 allocated for the host write can store data that is received from the host 2. The unit area 30 allocated for the GC write can store data that is read out from the NAND memory 20 by the garbage collection and is to be written in the NAND memory 20.

The host controller 11 and the NAND controller 12 constitute a first circuit that writes data received from the host 2 into the NAND memory 20 through the write buffer area 161.

Specifically, the host controller 11 receives data, which is requested to be written by a write command, from the host 2, and stores the received data into a unit area 30, which is allocated for the host write, in the write buffer area 161. When storing the data into the unit area 30, the host controller 11 informs the unit area 30 to the NAND controller 12. The NAND controller 12 writes the data, which is stored in the informed unit area 30, into the NAND memory 20. In this manner, the host controller 11 and the NAND controller 12 cooperate with each other, and thus data received from the host 2 is stored into the write buffer area 161 (more specifically, the unit area 30 allocated for the host write), and is subsequently written into the NAND memory 20 from the write buffer area 161.

The GC control circuit 15 and the NAND controller 12 constitutes a second circuit that reads out data stored in the NAND memory 20, and writes the read-out data into the NAND memory 20 through the write buffer area 161.

Specifically, the GC control circuit 15 controls the garbage collection. The GC control circuit 15 reads out at least valid data from a block 23 that is a copy source through the NAND controller 12. The GC control circuit 15 stores the read-out valid data into a unit area 30 that is allocated for the GC write. When storing data in the unit area 30, the GC control circuit 15 informs the unit area 30 to the NAND controller 12. The NAND controller 12 writes data, which is stored in the informed unit area 30, into the NAND memory 20. In this manner, the GC control circuit 15 and the NAND controller 12 cooperate with each other, and thus data read out from the NAND memory 20 is stored into the write buffer area 161 (more specifically, the unit area 30 allocated for the GC write), and is subsequently written into the NAND memory 20 from the write buffer area 161.

A unit area 30 from which stored data has been written into the NAND memory 20 is regarded as being in a used state. The unit area 30 in the used state is collected by the resource management circuit 14, and then is allocated again for the host write or the GC write by the resource management circuit 14.

Specifically, the NAND controller 12 is informed of a unit area 30 by the host controller 11 or the GC control circuit 15. The NAND controller 12 writes data, which is stored in the informed unit area 30, into the NAND memory 20. The NAND controller 12 may update the translation information 160 upon writing the data into the NAND memory 20. When writing of the data and updating of the translation information 160 are completed, the NAND controller 12 reports, to the resource management circuit 14, that the unit area 30 is in the used state. The unit area 30, which is reported to be in the used state by the NAND controller 12, cannot be used in any of the host write and the garbage collection until allocated again by the resource management circuit 14. The unit area 30 in the used state is collected by the resource management circuit 14 as a unit area 30 capable of being allocated again.

The CPU 13 realizes a predetermined function of the memory controller 10 in accordance with a program. The program is, for example, stored in a non-volatile memory (such as the NAND memory 20) in advance, and is loaded on the RAM 16 at start-up of the memory system 1. The CPU 13 executes the program loaded on the RAM 16 to realize the predetermined function.

For example, the CPU 13 instructs the GC control circuit 15 to initiate or stop the garbage collection. Initiation timing and stoppage timing of the garbage collection can be determined by any method.

In an example, the CPU 13 monitors a total size of empty areas. In a case where the total size is less than a predetermined threshold value, the CPU 13 instructs the GC control circuit 15 to initiate the garbage collection, and in a case where the total size is recovered to a predetermined threshold value, the CPU 13 instructs the GC control circuit 15 to stop the garbage collection. The threshold value for determination of initiation of the garbage collection and the threshold value for determination of the stoppage of the garbage collection may be same as or different from each other.

In another example, the CPU 13 calculates the initiation timing and the stoppage timing of the garbage collection so that a ratio between the amount of data written in the NAND memory 20 by the garbage collection write, and the amount of data written in the NAND memory 20 by the host write matches a specific ratio, and instructs the GC control circuit 15 to initiate or stop the garbage collection at timing obtained by the calculation. The specific ratio may be fixed or dynamically changed.

It should be noted that the CPU 13 may realize any function including updating of the translation information 160 and the like in addition to giving an instruction to initiate and stop the garbage collection.

Here, for example, in a case where unit areas 30, which can be allocated for the host write, are used up due to execution of the garbage collection, since unit areas 30 that can receive data from the host 2 is not sufficiently supplied, a data transfer rate from the host 2 to the memory system 1 becomes lowered. Accordingly, until the number of the unit areas 30, which can be allocated for the host write, is recovered after stopping the garbage collection, time required for execution of a write command from the host 2 becomes long. That is, latency for write access temporarily deteriorates.

In the first embodiment, a unit area 30b, which is a specific unit area 30 that is allocated for the host write at a constant time interval, is set in the write buffer area 161 to mitigate the temporal deterioration in latency for write access. As illustrated in FIG. 3, the write buffer area 161 includes one or more unit areas 30a which can be allocated for any of the GC write and the host write, and one or more unit areas 30b which can be allocated for the host write and cannot be allocated for the GC write. The resource management circuit 14 allocates each of the unit areas 30a for the GC write or the host write in correspondence with execution of the host write or the GC write. The resource management circuit 14 allocates each of the unit areas 30b for the host write at a predetermined time interval.

Since one or more unit areas 30b that can be allocated only for the host write is prepared, a unit area 30b is allocated for the host write at a predetermined time interval, for example, even in a case where unit areas 30a are used up due to the garbage collection, an area that can store data received from the host 2 is supplied at a predetermined time interval. Accordingly, the temporal deterioration in latency for write access is further mitigated in comparison to a case where the one or more unit areas 30b is not provided.

Figure 4:
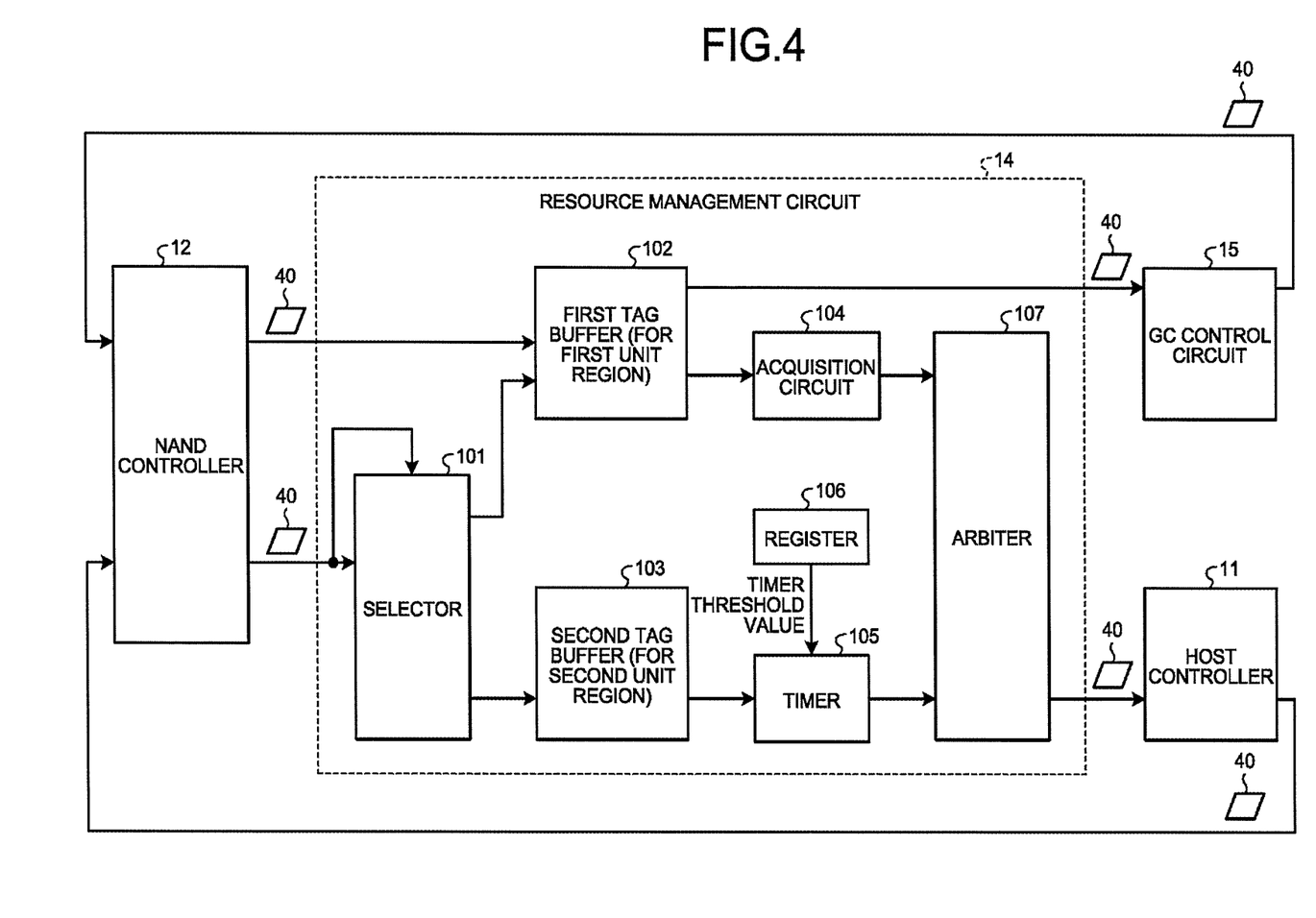
FIG. 4 is a view illustrating a configuration example of a resource management circuit according to the first embodiment.

FIG. 4 is a view illustrating a more detailed configuration example of the resource management circuit 14 according to the first embodiment.

A tag 40 corresponding to a unit area 30 that is allocated for the host write is transferred from the resource management circuit 14 to the host controller 11, thereby the unit area 30 is informed to the host controller 11. In addition, the tag 40 corresponding to the unit area 30 is transferred from the host controller 11 to the NAND controller 12, thereby a fact that data is stored in the unit area 30 is reported. In addition, the tag 40 corresponding to the unit area 30 is transferred from the NAND controller 12 to the resource management circuit 14, thereby a fact that the unit area 30 is in the used state is reported. In this manner, the tag 40 corresponding to the unit area 30 that is allocated for the host write is transferred from the resource management circuit 14, and then is returned to the resource management circuit 14 through the host controller 11 and the NAND controller 12.

A tag 40 corresponding to a unit area 30 that is allocated for the GC write is transferred from the resource management circuit 14 to the GC control circuit 15, thereby the unit area 30 is informed to the GC control circuit 15. In addition, the tag 40 corresponding to the unit area 30 is transferred from the GC control circuit 15 to the NAND controller 12, thereby a fact that data is stored in the unit area 30 is reported. In addition, the tag 40 corresponding to the unit area 30 is transferred from the NAND controller 12 to the resource management circuit 14, thereby a fact that the unit area 30 is in the used state is reported. In this manner, a tag 40 corresponding to a unit area 30 that is allocated for the GC write is transferred from the resource management circuit 14, and then is returned to the resource management circuit 14 through the GC control circuit 15 and the NAND controller 12.

The resource management circuit 14 includes a selector 101, a first tag buffer 102, a second tag buffer 103, an acquisition circuit 104, a timer 105, a register 106, and an arbiter 107.

The resource management circuit 14 stores a tag 40 corresponding to a unit area 30 (in order words, the unit area 30 that is collected) that is reported to be in the used state. The first tag buffer 102 and the second tag buffer 103 are memories that store the collected tag 40. One or more tags 40 can be stored in each of the tag buffers 102 and 103. Each of the tag buffers 102 and 103 can be constituted by any kind of memory. For example, the first tag buffer 102 and the second tag buffer 103 can be constituted by a register or an SRAM. Each tag 40 is input to or output from each of the tag buffers 102 and 103, for example, in accordance with a first in and first out (FIFO) rule. The rule relating to the input and output to and from each of the tag buffers 102 and 103 is not limited thereto.

A tag 40, which is received from the NAND controller 12, of the unit area 30 for the host write is input to the selector 101. The selector 101 determines whether the unit area 30 corresponding to the tag 40 is to be the unit area 30a or the unit area 30b. In a case where the unit area 30 corresponding to the tag 40 corresponds to the unit area 30a, the selector 101 inputs the tag 40 to the first tag buffer 102. In contrast, in a case where the unit area 30 corresponding to the tag 40 corresponds to the unit area 30b, the selector 101 transmits the tag 40 to the second tag buffer 103.

The selector 101 selects a transfer destination of the tag 40 based on a value of the tag 40. For example, according to the example in FIG. 3, in a case where the value of the tag 40 is in a range of #0 to # m−1, the selector 101 inputs the tag 40 to the first tag buffer 102. In a case where the value of the tag 40 is in a range of # m to # n−1, the selector 101 inputs the tag 40 to the second tag buffer 103.

The tag 40, which is received from the NAND controller 12, of the unit area 30 (that is, the unit area 30a) for the GC write is input to the first tag buffer 102.

As described above, the tag 40 corresponding to the unit area 30a that is used by the host write and the tag 40 corresponding to the unit area 30a that is used by the garbage collection are stored in the first tag buffer 102. In addition, the tag 40 corresponding to the unit area 30b that is used by the host write is stored in the second tag buffer 103.

During the garbage collection, in a case where a tag 40 is stored in the first tag buffer 102, the GC control circuit 15 acquires the tag 40 in correspondence with execution of the garbage collection.

In an example, the GC control circuit 15 acquires a tag 40 from the first tag buffer 102 for each relocation of data having a size of one unit area 30. In a case where the garbage collection is not executed or in a case where no tag 40 is stored in the first tag buffer 102 in execution of the garbage collection, the GC control circuit 15 does not perform acquisition of a tag 40 from the first tag buffer 102.

In a case where a tag 40 is stored in the first tag buffer 102, the acquisition circuit 104 acquires the tag 40 in correspondence with execution of the host write.

In an example, the acquisition circuit 104 includes a counter, and an upper limit of the number of unit areas 30a allowed to be allocated for the host write is set as an initial value of the counter. For example, the initial value is a predetermined value that is greater than 1 and less than m. The acquisition circuit 104 increments the value of the counter whenever a tag 40 is transmitted from the selector 101 to the first tag buffer 102, and decrements the value of the counter whenever a tag 40 is acquired from the first tag buffer 102. In a case where one or more tags 40 are stored in the first tag buffer 102, and the value of the counter is 1 or greater, the acquisition circuit 104 acquires a tag 40 from the first tag buffer 102. In a case where the value of the counter is 0, the acquisition circuit 104 does not acquire a tag 40 from the first tag buffer 102. According to this configuration, in a case where the value of the counter is 1 or greater (that is, the number of the unit areas 30a allocated for the host write does not reach the upper limit), and the first tag buffer 102 is not empty, the acquisition circuit 104 can acquire a tag 40 from the first tag buffer 102. In addition, in a case where the value of the counter is zero (that is, the number of the unit areas 30a allocated for the host write reaches the upper limit), or the first tag buffer 102 is empty, the acquisition circuit 104 does not acquire a tag 40 from the first tag buffer 102.

As described above, the acquisition circuit 104 tries to acquire a tag 40 from the first tag buffer 102 whenever data, which is received from the host 2 and is stored in a unit area 30a, is written into the NAND memory 20 and thus the unit area 30a becomes in the used state. As a result, the acquisition circuit 104 acquires a tag 40 in correspondence with execution of the host write.

A timer threshold value is stored in the register 106. For example, the timer threshold value is set to the register 106 by the CPU 13. The timer 105 counts elapsed time. In a case where the elapsed time reaches the timer threshold value, the timer 105 resets the count of the elapsed time and restarts the count, and acquires the predetermined number of tags 40 (for example, one piece) from the second tag buffer 103. The timer 105 inputs the acquired tags 40 to the arbiter 107.

The arbiter 107 transfers a tag 40, which is input from the acquisition circuit 104 or the timer 105, to the host controller 11. In a case where a tag 40 or tags 40 are input from only one of the acquisition circuit 104 and the timer 105, the arbiter 107 transfers the inputted tag 40 or tags 40 to the host controller 11. In a case where tags 40 are simultaneously input from both of the acquisition circuit 104 and the timer 105, the arbiter 107 arbitrates the tags 40 to be transferred. For example, the arbiter 107 arbitrates in a round-robin method. The arbitration method is not limited thereto.

According to above-described configuration, in a case where a unit area 30b allocated for the host write becomes in the used state, a tag 40 corresponding to the unit area 30b is stored in the second tag buffer 103 through the selector 101. The timer 105 acquires the tag 40 from the second tag buffer 103 whenever the setting time set as the timer threshold value is elapsed. In a case where the tag 40 stored in the second tag buffer 103 is acquired by the timer 105, the tag 40 is transferred to the host controller 11 through the arbiter 107. Accordingly, the resource management circuit 14 can sequentially acquire one or more tags 40, which are stored in the second tag buffer 103 and respectively correspond to the collected unit areas 30b, whenever the setting time is elapsed, and can inform the tags 40 which are acquired to the host controller 11. In other words, the resource management circuit 14 can allocate the collected unit areas 30b for the host write for each setting time.

In addition, the tag 40 corresponding to the unit area 30a allocated for the host write, and the tag 40 corresponding to the unit area 30a allocated for the GC write are stored in the first tag buffer 102 in a case where the unit areas 30a are used. The tag 40 stored in the first tag buffer 102 is acquired in correspondence with execution of the garbage collection by the GC control circuit 15, or is acquired in correspondence with execution of the host write by the acquisition circuit 104. In a case where a new unit area 30a is necessary for execution of the garbage collection or the host write, the tag 40 stored in the first tag buffer 102 is immediately allocated for the host write or the garbage collection. That is, in correspondence with writing of data in the NAND memory 20 from the unit area 30a, the resource management circuit 14 can allocate the unit area 30a for the host write or the garbage collection.

It has been explained that a tag 40, which corresponds to a unit area 30a allocated for the GC write and becomes in the used state, is stored in the first tag buffer 102, and a tag 40, which corresponds to a unit areas 30a or 30b allocated for the host write and becomes in the used state, is input to the selector 101. A method of discriminating a tag 40 corresponding to the unit area 30a used by the garbage collection, and a tag 40 corresponding to a unit area 30a or 30b used by the host write is not limited to a specific method.

In an example, the NAND controller 12 receives a tag 40 from the GC control circuit 15 and a tag 40 from the host controller 11 in queues different from each other. In addition, the NAND controller 12 stores the tag 40 received from the GC control circuit 15 in the first tag buffer 102 and inputs the tag 40 received from the host controller 11 to the selector 101.

In another example, the GC control circuit 15 adds, to an acquired tag 40, information indicating that it is used for the garbage collection write. In addition, the host controller 11 adds, to the tag 40 that is transmitted from the arbiter 107, information indicating that it is used for the host write. The NAND controller 12 or the resource management circuit 14 determine whether a tag 40 is to be stored in the first tag buffer 102 or is to be input to the selector 101 based on the information added to the tag 40.

As described above, according to the first embodiment, the write buffer area 161 includes one or more unit areas 30b which can be allocated for the host write and cannot be allocated for the garbage collection write. The resource management circuit 14 includes the timer 105, and sequentially acquires, whenever a time set as the timer threshold value is elapsed, tags 40, which are stored in the second tag buffer 103 and corresponds to a unit area 30b in the used state, and transfers the acquired tag 40 to the host controller 11. In other words, the resource management circuit 14 allocates, for the host write, for each setting time, a unit area 30b which has been in the used state.

According to the configuration, in a case where unit areas 30a are used up due to the garbage collection, an area capable of storing data received from the host 2 is supplied at the setting time interval. Accordingly, a temporal deterioration in latency for write access is further mitigated in comparison to a case where no unit area 30b is provided. That is, a fluctuation of the latency for write access is mitigated.

Second Embodiment

In the first embodiment, it has been explained that a unit area 30b is periodically allocated for the host write. A time interval for allocating a unit area 30b may not be constant.

Figure 5:
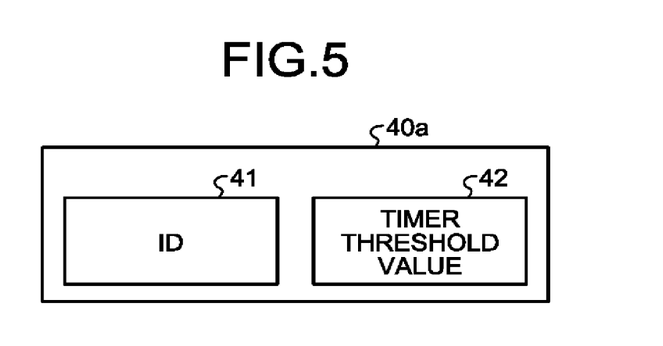
FIG. 5 is a view illustrating a configuration example of a tag according to a second embodiment.

In the second embodiment, setting time is individually set to a plurality of the unit areas 30b. As an example of the configuration, as illustrated in FIG. 5, each tag 40a includes a timer threshold value 42 in addition to an ID 41 indicating a corresponding unit area 30.

Figure 6:
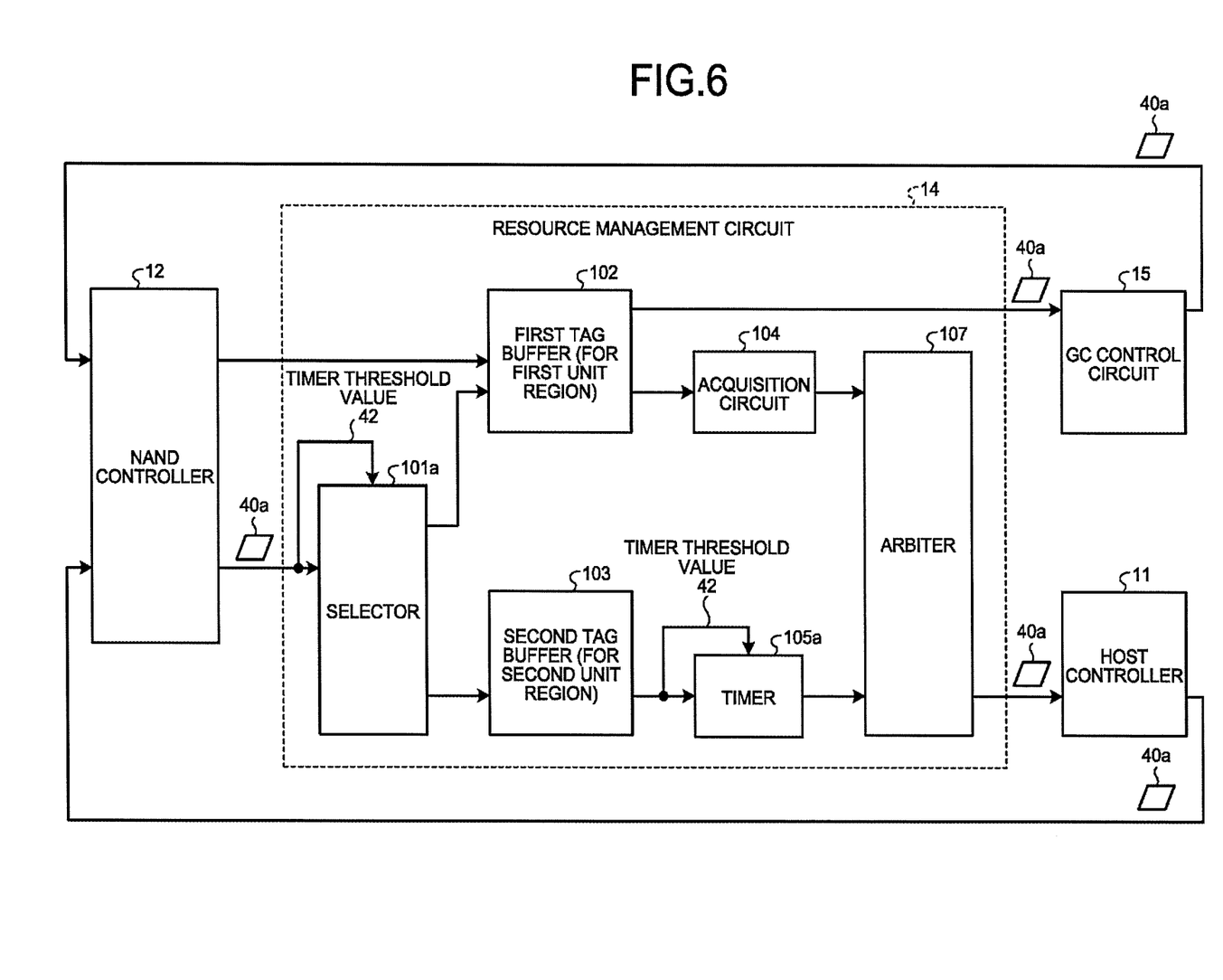
FIG. 6 is a view illustrating a configuration example of a resource management circuit according to the second embodiment.

As illustrated in FIG. 6, a resource management circuit 14 according to the second embodiment includes a selector 101a, a first tag buffer 102, a second tag buffer 103, an acquisition circuit 104, a timer 105a, and an arbiter 107. In the constituent elements, the same reference numeral as in the first embodiment is given to a constituent element having the same function as in the first embodiment. Detailed description of the constituent element having the same function as in the first embodiment will be omitted.

In a case where a tag 40a is input, the selector 101a determines whether the tag 40a (more specifically, the ID 41 included in the tag 40a) corresponds to a unit area 30a or a unit area 30b based on the timer threshold value 42 included in the tag 40a. For example, zero is set as the timer threshold value 42 of the tag 40a of the unit area 30a, and a positive value greater than zero is set as the timer threshold value 42 of the tag 40a of the unit area 30b. In this case, the selector 101a can determine that the tag 40a corresponds to a unit area 30a or a unit area 30b based on whether or not the timer threshold value 42 is zero. The selector 101a, if the tag 40a corresponds to a unit area 30a, inputs the tag 40a to the first tag buffer 102, and, if the tag 40a corresponds to a unit area 30b, inputs the tag 40a to the second tag buffer 103.

As in the first embodiment, the selector 101a may determine whether a tag 40a corresponds to the unit area 30a or the unit area 30b based on the ID 41.

In a case where one or more tags 40a are stored in the second tag buffer 103, the timer 105a acquires one of the tags 40a from the second tag buffer 103. The timer 105a reads the timer threshold value 42 included in the acquired tag 40a. Then, the timer 105a inputs the tag 40a to the arbiter 107 after a time elapsed since acquiring the tag 40a reaches the timer threshold value 42. After inputting the one tag 40a to the arbiter 107, the timer 105a can acquire a subsequent tag 40a from the second tag buffer 103. Accordingly, a tag 40a stored in the second tag buffer 103 is transmitted to the arbiter 107 after a time elapsed since a previous tag 40a is transmitted to the arbiter 107 reaches a value set as the timer threshold value 42.

A configuration of the timer 105a is not limited to the above-described configuration. For example, the timer 105a includes a free-run counter, and when a tag 40a is input to the second tag buffer 103, the timer 105a reads the timer threshold value 42 of the tag 40a. Based on a count value of the free-run counter, the timer 105a inputs the tag 40a to the arbiter 107 at timing after time elapsed since inputting the tag 40a to the second tag buffer 103 reaches a value set as the timer threshold value 42 included in the tag 40a. According to this configuration, a tag 40a of which the timer threshold value 42 is small can be quickly transmitted from the second tag buffer 103 to the arbiter 107 in comparison to a tag 40a which is previously stored in the second tag buffer 103 and of which the timer threshold value 42 is large.

As described above, the resource management circuit 14 according to the second embodiment can allocate respective unit area 30 for host write at timing based on the timer threshold value 42 included in corresponding tags 40a. In other words, the resource management circuit 14 sequentially allocates each of the unit areas 30b corresponding to the respective tags 40a stored in the second tag buffer 103 for the host write at timing in correspondence with the timer threshold value 42 included in the corresponding tags 40a. Accordingly, a time interval for allocating unit areas 30b for the host write can be set with respect to each unit area 30b.

Third Embodiment

Figure 7:
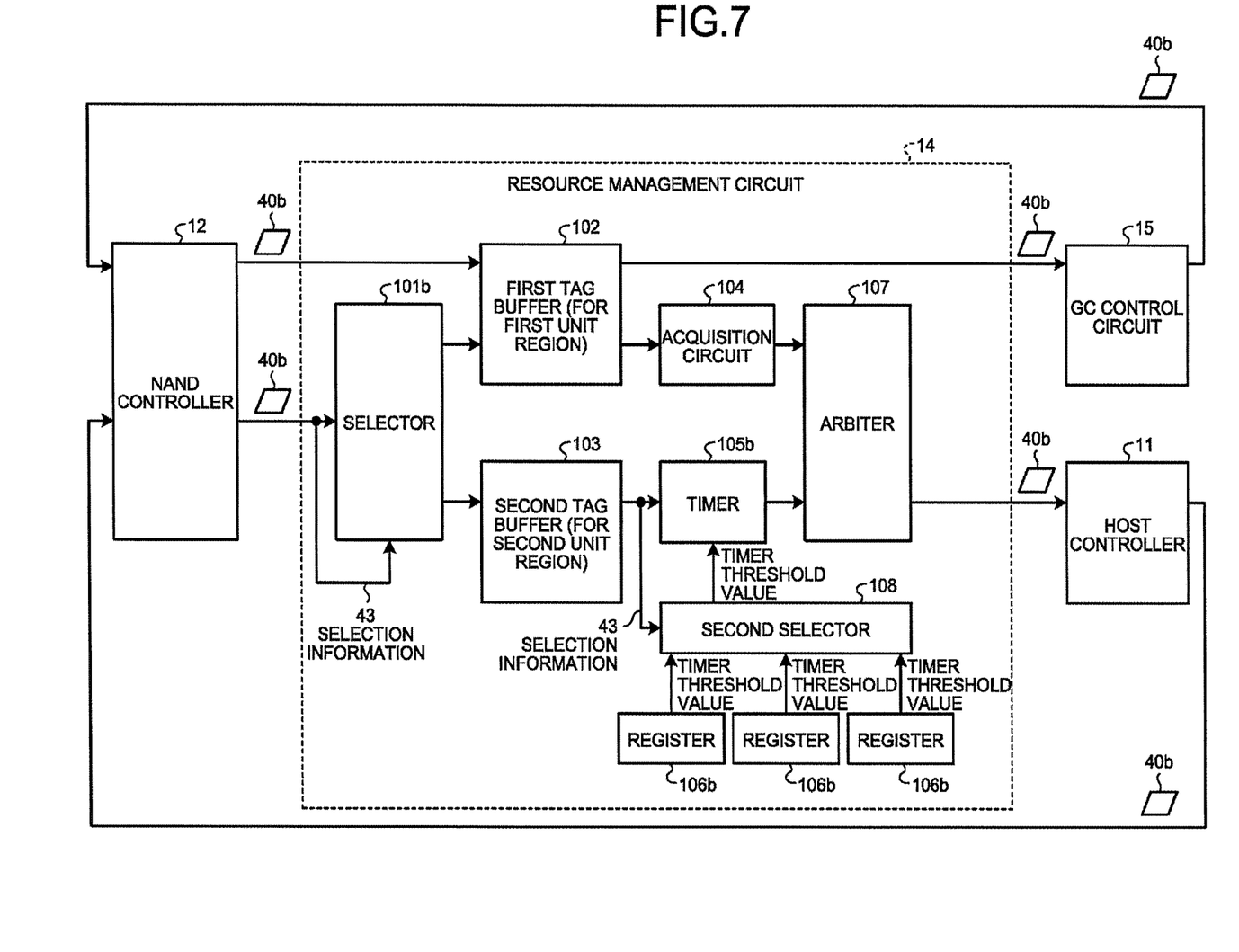
FIG. 7 is a view illustrating a configuration example of a resource management circuit according to a third embodiment.

FIG. 7 is a view illustrating a configuration example of a resource management circuit 14 according to a third embodiment. The resource management circuit 14 according to the third embodiment includes a selector 101b, a first tag buffer 102, a second tag buffer 103, an acquisition circuit 104, a timer 105b, a plurality of (here, three as an example) registers 106b, and arbiter 107, and a second selector 108. In the constituent elements, the same reference numeral as in the first embodiment is given to a constituent element having the same function as in the first embodiment. Detailed description of the constituent element having the same function as in the first embodiment will be omitted.

Timer threshold values are respectively stored in the registers 106b. The timer threshold values stored in the different registers 106b may be different from or same as each other. Here, it is assumed that different timer threshold values are stored in the plurality of registers 106b. Each of the timer threshold value is stored in each of the register 106b, for example, by the CPU 13.

Figure 8:
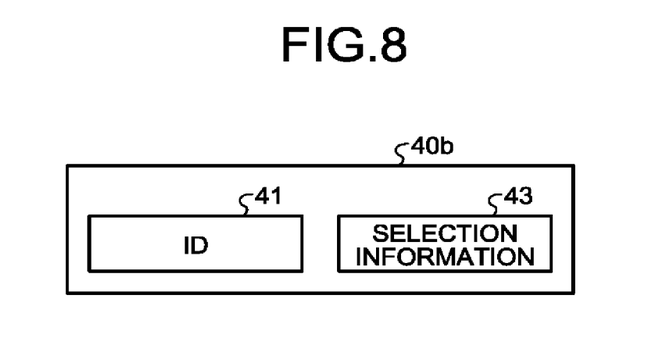
FIG. 8 is a view illustrating a configuration example of a tag according to the third embodiment.

As illustrated in FIG. 8, each tag 40b includes selection information 43 in addition to the ID 41. The selection information 43 is information indicating one among the plurality registers 106b.

In a case where a tag 40b is input, the selector 101b determines whether the tag 40b (more specifically, the ID 41 included in the tag 40b) indicates a unit area 30a or a unit area 30b based on the selection information 43 included in the tag 40b. A value which does not indicate any one of the plurality registers 106b (invalid value) can be set as the selection information 43 of the tag 40b corresponding to the unit area 30a. The selector 101b can determine whether the tag 40b corresponds to the unit area 30a or the unit area 30b, based on whether the invalid value is set as the selection information 43.

As in the first embodiment, the selector 101b may determine whether the tag 40b corresponds to a unit area 30a or a unit area 30b based on the ID 41.

The selector 101b inputs a tag 40b corresponding to a unit area 30a in the first tag buffer 102, and inputs a tag 40b corresponding to a unit area 30b in the second tag buffer 103.

When the timer 105b acquires a tag 40b from the second tag buffer 103, the selection information 43 included in the tag 40b is input to the second selector 108. The second selector 108 acquires a timer threshold value from a register 106b, which is indicated by the selection information 43, among the plurality of registers 106b, and inputs the acquired timer threshold value to the timer 105b.

The timer 105b inputs the tag 40b to the arbiter 107 after a time elapsed since acquiring the tag 40b reaches a value set as the timer threshold value. After inputting one tag 40b to the arbiter 107, the timer 105b can acquire a subsequent tag 40b from the second tag buffer 103.

As described above, a timer threshold value stored in a register 106b, which is selected by the selection information 43, among the plurality of registers 106b is used. The selection information 43 is included in each tag 40b. The timer threshold value is set to each of the plurality of registers 106b, and one register 106b can be selected by the selection information 43. Accordingly, it is possible to select, for each unit area 30b, any one among the plurality of timer threshold values prepared in advance.

As described above, according to the third embodiment, as in the second embodiment, a time interval for allocating unit areas 30b for the host write can be set with respect to each unit area 30b.

Furthermore, the selection information 43 has a size corresponding to the number of the registers 106b. For example, in a case where four registers 106b are provided, the selection information 43 has a size of at least two bits. The number of the registers 106b is set so that the size of the selection information 43 becomes smaller than the size of the timer threshold value, thereby the size of the tag 40b becomes smaller in comparison to the second embodiment.

Fourth Embodiment

In a fourth embodiment, each unit area 30 has a configuration capable of being switched between the unit area 30a and the unit area 30b.

Figure 9:
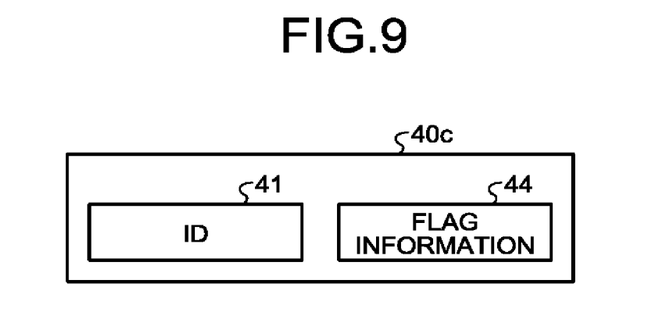
FIG. 9 is a view illustrating a configuration example of a tag according to a fourth embodiment.

FIG. 9 is a view illustrating a configuration example of a tag 40c according to the fourth embodiment. As illustrated in the drawing, the tag 40c includes flag information 44 in addition to the ID 41. The flag information 44 is setting information indicating whether the unit area 30 corresponding to the tag 40c (more specifically, the ID 41 included in the tag 40c) corresponds to the unit area 30a or the unit area 30b.

Figure 10:
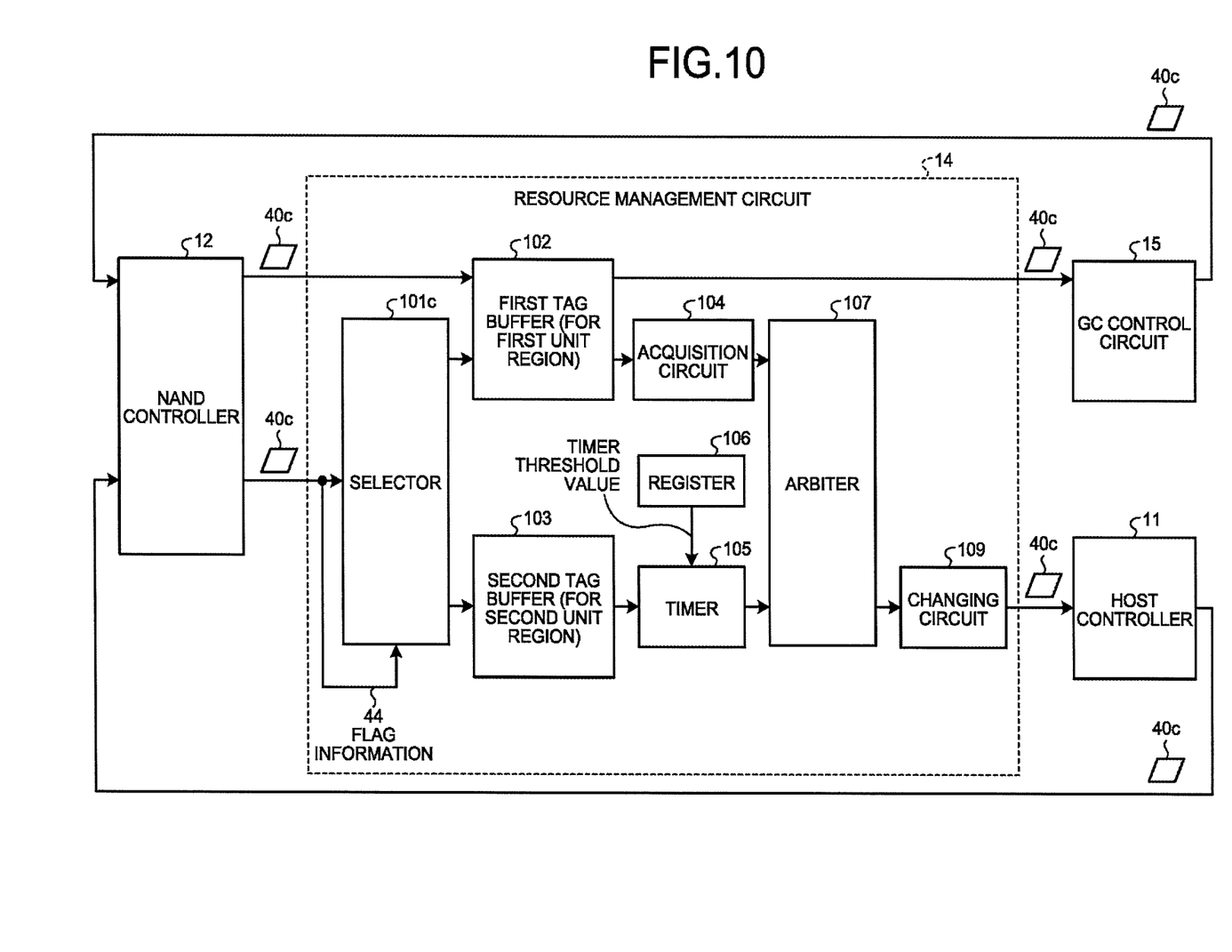
FIG. 10 is a view illustrating a configuration example of a resource management circuit according to the fourth embodiment.

FIG. 10 is a view illustrating a configuration example of a resource management circuit 14 according to the fourth embodiment. The resource management circuit 14 according to the fourth embodiment includes a selector 101c, a first tag buffer 102, a second tag buffer 103, an acquisition circuit 104, a timer 105, a register 106, an arbiter 107, and a changing circuit 109. In the constituent elements, the same reference numeral as in the first embodiment is given to a constituent element having the same function as in the first embodiment. Detailed description of the constituent element having the same function as in the first embodiment will be omitted.

In a case where a tag 40c is input, the selector 101c determines whether the tag 40c corresponds to a unit area 30a or a unit area 30b based on the flag information 44 included in the tag 40c. The selector 101b inputs the tag 40c corresponding to a unit area 30a to the first tag buffer 102 and inputs a tag 40c corresponding to a unit area 30b to the second tag buffer 103.

As in the first embodiment, the selector 101c may determine whether the tag 40c corresponds to the unit area 30a or the unit area 30b based on the ID 41.

The changing circuit 109 is provided between the arbiter 107 and the host controller 11. The changing circuit 109 can switch each unit area 30 between the unit area 30a and the unit area 30b by operating the flag information 44 that is included in the tag 40c output from the arbiter 107.

Specifically, when receiving, from the arbiter 107, a tag 40c in which a value corresponding to the unit area 30a is set as the flag information 44, the changing circuit 109 can change the value of the flag information 44 to the value corresponding to the unit area 30b. Thereby the unit area 30 indicated by the tag 40c is changed from the unit area 30a to the unit area 30b. In addition, when receiving a tag 40c including the flag information 44 to which a value corresponding to the unit area 30b is set, the changing circuit 109 can change the value of the flag information 44 to a value corresponding to the unit area 30a. Thereby the unit area 30 indicated by the tag 30 is changed from the unit area 30b to the unit area 30a.

With regard to the tag 40c of which the value of the flag information 44 is changed, when the unit area 30 corresponding to the tag 40c becomes in the used state, and the tag 40c is transferred from the NAND controller 12 to the resource management circuit 14, a buffer, which is a transfer destination, between the first tag buffer 102 and the second tag buffer 103 is determined by the selector 101c based on the changed value of the flag information 44.

As described above, according to the fourth embodiment, the resource management circuit 14 is provided with the changing circuit 109 that switches a value of the flag information 44 included in the tag 40c between a value corresponding to the unit area 30a and a value corresponding to the unit area 30b. Accordingly, a unit area 30 can be switched between a unit area 30a and a unit area 30b.

It should be noted that an algorithm of handling the flag information 44 by the changing circuit 109 is not limited to a specific algorithm.

In an example, the changing circuit 109 monitors the number of tags 40c in the first tag buffer 102, and controls the flag information 44 based on the number of the tags 40c in the first tag buffer 102. More specifically, for example, in a case where the number of the tags 40c in the first tag buffer 102 is a first value, the changing circuit 109 further increases the number of the unit areas 30b in comparison to a case where the number of the tags 40c in the first tag buffer 102 is a second value greater than the first value. In contrast, in a case where the number of the tags 40c in the first tag buffer 102 is the second value, the changing circuit 109 further decreases the number of the unit areas 30b in comparison to a case where the number of the tags 40c in the first tag buffer 102 is the first value.

As the number of the tags 40c in the first tag buffer 102 decreases, latency for the write access gradually deteriorates. As described above, the number of the unit areas 30b increases in a case where the number of the tag 40c in the first tag buffer 102 decreases. Thereby, it is possible to mitigate the deterioration of the latency for the write access.

Hereinbefore, an example in which the fourth embodiment is applied to the resource management circuit 14 to which the first embodiment is applied has been explained. The fourth embodiment is also applicable to the resource management circuit 14 to which the second embodiment is applied, and the resource management circuit 14 to which the third embodiment is applied. For example, in a case where the fourth embodiment is applied to the resource management circuit 14 to which the second embodiment is applied, the changing circuit 109 may be configured to operate the timer threshold value 42 of the tag 40a. In a case where the fourth embodiment is applied to the resource management circuit 14 to which the third embodiment is applied, the changing circuit 109 may be configured to operate the selection information 43 in the tag 40b.

Fifth Embodiment

Figure 11:
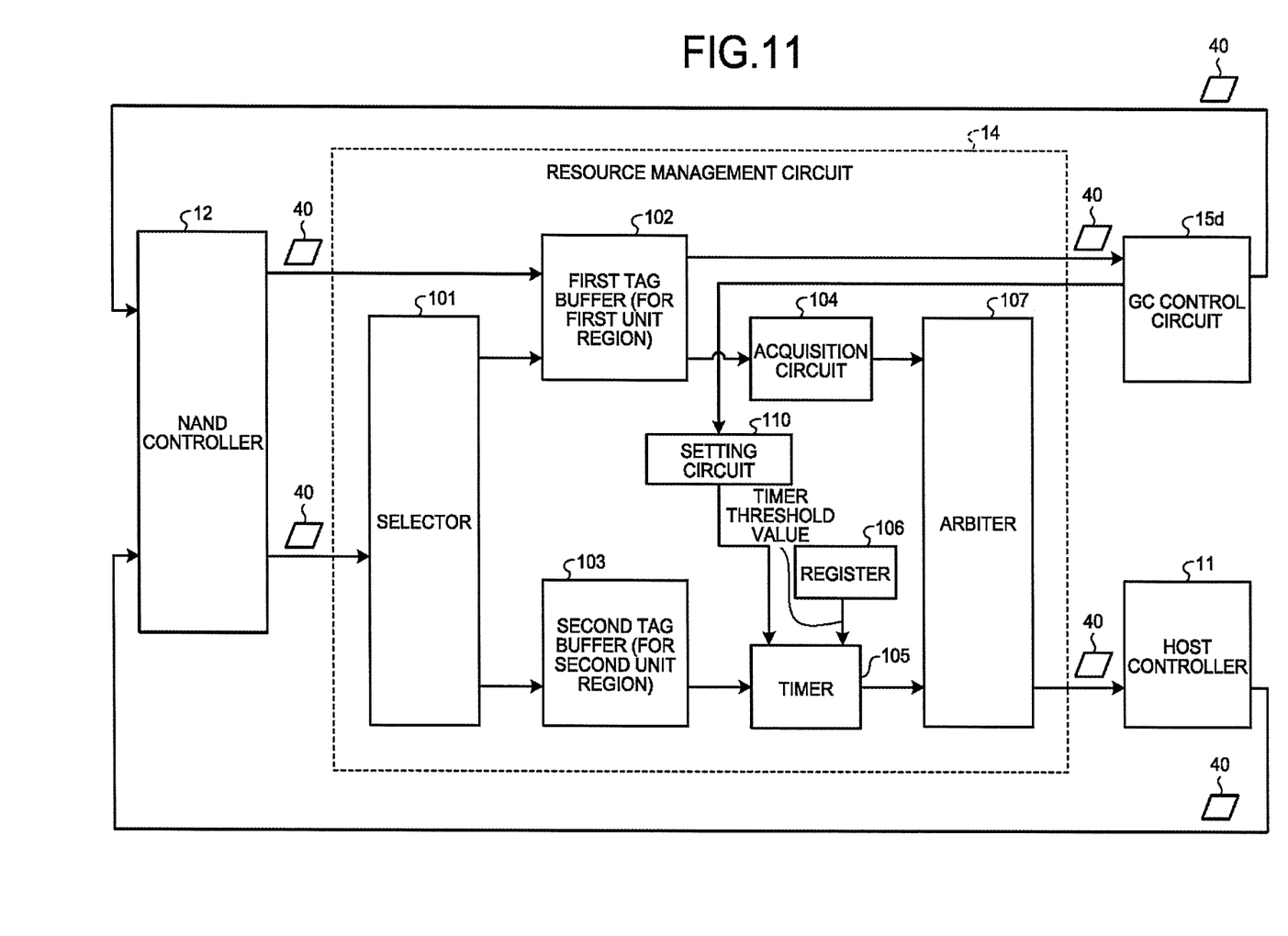
FIG. 11 is a view illustrating a configuration example of a resource management circuit according to a fifth embodiment.

FIG. 11 is a view illustrating a configuration example of a resource management circuit 14 according to a fifth embodiment. The resource management circuit 14 according to the fifth embodiment includes a selector 101, a first tag buffer 102, a second tag buffer 103, an acquisition circuit 104, a timer 105, a register 106, an arbiter 107, and a setting circuit 110. In addition, in the fifth embodiment, a GC control circuit 15d is provided instead of the GC control circuit 15. In the constituent elements, the same reference numeral as in the first embodiment is given to a constituent element having the same function as in the first embodiment. Detailed description of the constituent element having the same function as in the first embodiment will be omitted.

The GC control circuit 15d executes the same operation as that of the GC control circuit 15 in the first embodiment. In addition, the GC control circuit 15d reports, to the setting circuit 110, execution and non-execution of the garbage collection. For example, in a case where the garbage collection is initiated, the GC control circuit 15d reports the initiation of the garbage collection to the setting circuit 110. In addition, in a case where the garbage collection is stopped, the GC control circuit 15d reports the stoppage of the garbage collection to the setting circuit 110.

The setting circuit 110 stops or resumes an operation of the timer 105 based on the reports from the GC control circuit 15d. The setting circuit 110 keeps stopping the operation of the timer 105 in non-execution of the garbage collection, and operates the timer 105 in execution of the garbage collection.

In non-execution of the garbage collection, unit areas 30a that can be allocated for the host write are less likely to be used up in comparison to execution of the garbage collection. In non-execution of the garbage collection, it will reduce the need for allocating unit areas 30b at a constant time interval. According to the fifth embodiment, in execution of the garbage collection, the timer 105 is in operation, and thus the resource management circuit 14 allocates the unit areas 30b. In non-execution of the garbage collection, the timer 105 is in non-operation, and thus the resource management circuit 14 does not allocate the unit areas 30b. Accordingly, it is possible to mitigate the deterioration of the write latency only when needed.

Sixth Embodiment

Figure 12:
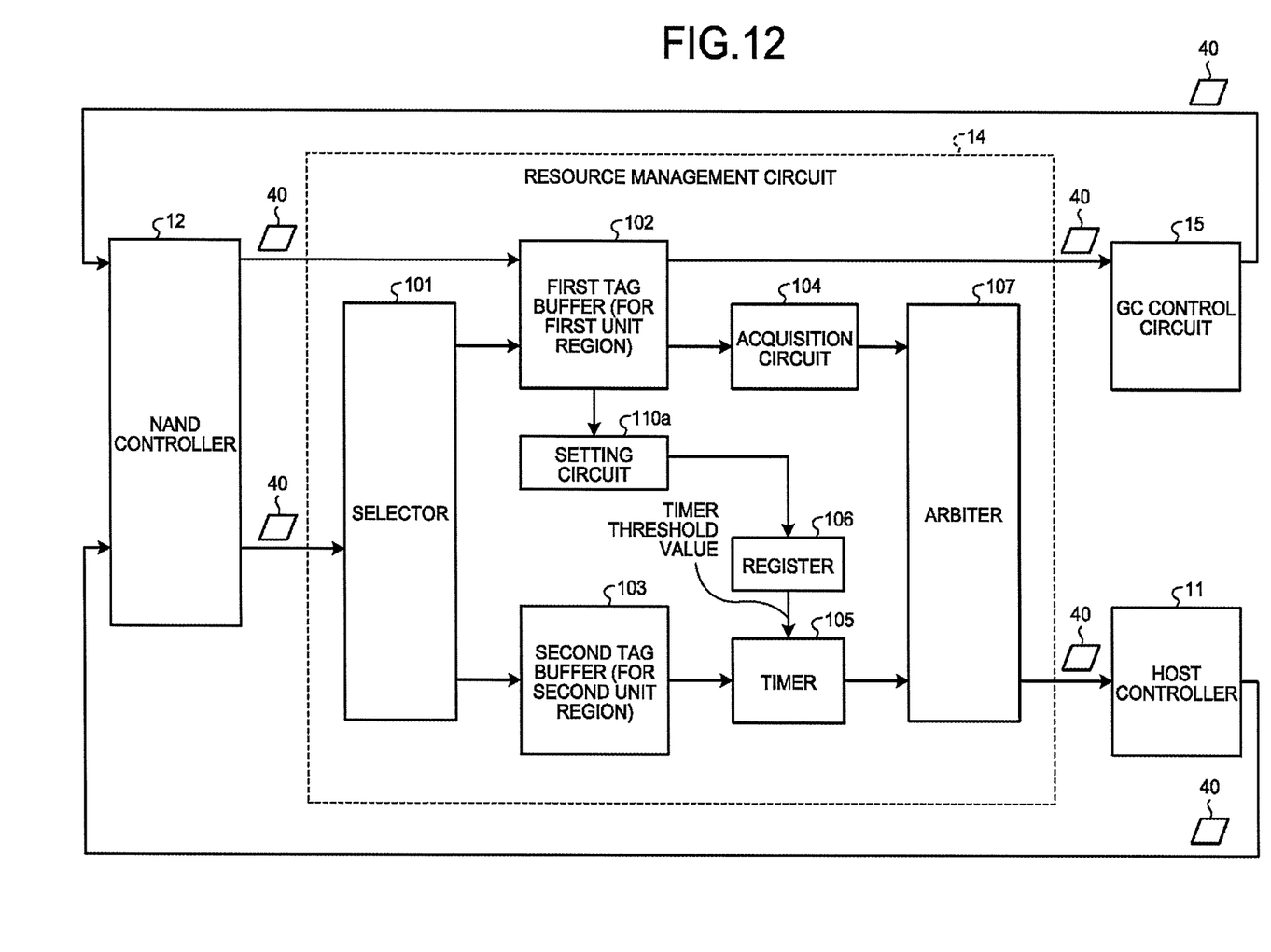
FIG. 12 is a view illustrating a configuration example of a resource management circuit according to a sixth embodiment.

FIG. 12 is a view illustrating a configuration example of a resource management circuit 14 according to a sixth embodiment. The resource management circuit 14 according to the sixth embodiment includes a selector 101, a first tag buffer 102, a second tag buffer 103, an acquisition circuit 104, a timer 105, a register 106, an arbiter 107, and a setting circuit 110a. In the constituent elements, the same reference numeral as in the first embodiment is given to a constituent element having the same function as in the first embodiment. Detailed description of the constituent element having the same function as in the first embodiment will be omitted.

The setting circuit 110a monitors the number of tags 40 in the first tag buffer 102, and sets a timer threshold value based on the number of the tags 40 in the first tag buffer 102.

In an example, in a case where the number of the tags 40 in the first tag buffer 102 is a third value, the setting circuit 110a sets a fourth value as the timer threshold value. In a case where the number of the tags 40 in the first tag buffer 102 is a fifth value greater than the third value, the setting circuit 110a sets a sixth value as the timer threshold value. Here, the sixth value is smaller than the fourth value. In this manner, the setting circuit 110a increases the timer threshold value in a case where the number of the tags 40 in the first tag buffer 102 is small, and decreases the timer threshold value in a case where the number of the tags 40 in the first tag buffer 102 is large. According to this, in a case where the unit areas 30a, which can be allocated for the host write, sufficiently exist, a time interval for allocating the unit areas 30b is shortened or set to zero. Thereby it is possible to mitigate the deterioration of the write latency when needed.

An algorithm of changing the timer threshold value can be modified in various manners.

An algorithm using statistic information generated in the memory system 1 can be considered for another example of an algorithm. For example, the CPU 13 records the number of write commands received from the host 2 as the statistic information. The setting circuit 110a may change the timer threshold value based on this statistic information. In an example, in a case where the frequency of receiving the write commands from the host 2 is a seventh value, the setting circuit 110a sets an eighth value as the timer threshold value. In a case where the frequency of receiving the write commands from the host 2 is a ninth value greater than the seventh value, the setting circuit 110a sets a tenth value as the timer threshold value. The tenth value is greater than the eighth value.

As described in the first to sixth embodiments, the resource management circuit 14 according to each of the embodiments includes the timer 105. In a case where the unit area 30b is in the used state, the resource management circuit 14 allocates again the unit area 30b for the host write at timing corresponding to the timer threshold value set to the timer 105. That is, the resource management circuit 14 allocates the unit area 30b for the host write at timing corresponding to setting time that is set to the timer 105 upon writing data stored in the unit area 30b into the NAND memory 20. According to this, even in a case where the unit areas 30a are used up due to the garbage collection, areas capable of storing data received from the host 2 are sequentially supplied. Accordingly, a temporal deterioration in latency for write access is further mitigated in comparison to a case where the unit areas 30b are not provided, and as a result, a fluctuation of the latency for the write access is mitigated.

A plurality of memory systems may be connected to the host 2. There is a known method in which the host 2 divides one file into a plurality of partial files, and the partial files are dispersed to the plurality of memory system 1. This method may be referred to as "write stream". In a case where the write stream is applied, if a deviation exists in latency for the write access between the plurality of memory systems, latency for the write access with respect to the plurality of memory systems deteriorates because a memory system 1 which is the poorest in latency becomes a bottle neck. When the memory system 1 according to each of the first to sixth embodiment is applied as a memory system, a fluctuation of latency for write accesses in the memory system 1 is mitigated. Thereby it is possible to reduce a deviation of latency between the plurality of memory systems 1. Accordingly, in a case where the write stream is applied, it is possible to reduce the fluctuation of latency for write accesses in the plurality of memory systems 1.

In addition, there is a known technology of throttling the performance of the memory system so as to suppress the deterioration of the NAND memory. In the memory system 1 according to any of the first to sixth embodiments, the number of unit areas 30b and the number of unit areas 30a can be set in any manner. An instantaneous maximum value and an instantaneous minimum value of latency for write accesses vary in correspondence with the setting of the number of unit areas 30b and the number of unit areas 30a. It is possible to throttle the performance of the memory system 1 by devising the setting of the number of unit areas 30b and the number of unit areas 30a.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
   a non-volatile memory;
   a first buffer;
   a first circuit configured to write data received from the host into the non-volatile memory through the first buffer;
   a second circuit configured to read out data from the non-volatile memory, and write the read data into the non-volatile memory through the first buffer, wherein the first buffer includes a second buffer that is capable of being allocated to the first circuit and the second circuit, and the first buffer also includes a third buffer that is configured to be allocated to the first circuit and not allocated to the second circuit, the third buffer includes a plurality of first unit areas; and
   a third circuit including a timer, the third circuit configured to:
      allocate the second buffer to the first circuit or to the second circuit upon writing data into the non-volatile memory from the second buffer,
      in response to (i) writing of data from one of the plurality of first unit areas of the third buffer into the non-volatile memory having been completed and (ii) updating of address translation information having been completed such that a logical address associated with the data designated by the host is mapped to a physical address of an area of the non-volatile memory into which the data has been written, inhibit the one of the plurality of first unit areas of the third buffer from being allocated to the first circuit based on an indication that the one of the plurality of first unit areas is in used state, and start the timer, and
      allocate the one of the plurality of first unit areas of the third buffer to the first circuit upon the timer expiring.

2. The memory system according to claim 1, wherein the third circuit further includes a fourth buffer configured to store information indicating one or more first unit areas, among the plurality of first unit areas, from which data has been written in the non-volatile memory, and
the third circuit is configured to allocate each of the one or more first unit areas, which is indicated by the information stored in the fourth buffer, to the first circuit.

3. The memory system according to claim 1, wherein each of the plurality of first unit areas is identified by a tag including a setting time, and
the third circuit includes a fourth buffer configured to store one or more first tags each corresponding to a first unit area, among the plurality of first unit areas, from which data has been written into the non-volatile memory, and configured to sequentially allocate each first unit area corresponding to the one or more first tags stored in the fourth buffer, to the first circuit at timing based on each setting time included in the one or more first tags.

4. The memory system according to claim 1, wherein each of the plurality of first unit areas is identified by a tag that includes designation information designating one among a plurality of pieces of setting information, and
the third circuit includes a register configured to store a plurality of setting times, and a fourth buffer configured to store one or more first tags each corresponding to a first unit area, among the plurality of first unit areas, from which data has been written in the non-volatile memory, and is configured to sequentially allocate each first unit area corresponding to the one or more first tags stored in the fourth buffer, to the first circuit at timing based on, among the plurality of setting times, a setting time designated by a designation information included in a corresponding first tag among the one or more first tags stored in the fourth buffer.

5. The memory system according to claim 1, wherein
each of the plurality of first unit areas is identified by a tag including setting information that indicates whether a corresponding first unit area belongs to the third buffer, and the third circuit further includes a changing circuit configured to increase or decrease a number of first unit areas by operating the tag for each first unit area.

6. The memory system according to claim 5, wherein
the second buffer includes a plurality of second unit areas,
the third circuit further includes a fourth buffer that stores information indicating one or more second unit areas, among the plurality of second unit areas, from which data has been written in the non-volatile memory, and
the changing circuit is configured to increase or decrease the number of first unit areas in correspondence with a number of second unit areas which are indicated by the information stored in the fourth buffer.

7. The memory system according to claim 6, wherein in a case where the number of second unit areas which are indicated by the information stored in the fourth buffer is a first value, the changing circuit is configured to increase the number of first unit areas in comparison to a case where the number of second unit areas which are indicated by the information stored in the fourth buffer is a second value greater than the first value.

8. The memory system according to claim 1, wherein the third circuit is further configured to keep stopping allocation of the third buffer in a case where the second circuit does not execute a first process, the first process including reading out data from the non-volatile memory and writing the data into the non-volatile memory through the first buffer, and execute allocation of the third buffer in a case where the second circuit is in execution of the first process.

9. The memory system according to claim 2, wherein the third circuit further includes a setting circuit configured to change a setting time of the timer.

10. The memory system according to claim 9, wherein
the second buffer includes a plurality of second unit areas,
the third circuit additionally includes a fifth buffer that stores information indicating one or more second unit areas, among the plurality of second unit areas, from which data has been written into the non-volatile memory, and
the setting circuit is configured to change the setting time in correspondence with a number of second unit areas which are indicated by the information stored in the fifth buffer.

11. The memory system according to claim 10, wherein the setting circuit is further configured to set a second value in a case where the number of second unit areas indicated by the information stored in the fifth buffer is a first value, and set a fourth value smaller than the second value in a case where the number of second unit areas indicated by the information stored in the fifth buffer is a third value greater than the first value.

12. The memory system according to claim 9, wherein the setting circuit is configured to change the setting time based on statistic information relating to write commands received from the host.

* * * * *